(12) United States Patent
Takeyama et al.

(10) Patent No.: US 12,107,537 B2
(45) Date of Patent: Oct. 1, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/138,738

(22) Filed: Apr. 25, 2023

(65) Prior Publication Data

US 2023/0353089 A1    Nov. 2, 2023

(30) Foreign Application Priority Data

May 2, 2022    (JP) ................................. 2022-076267

(51) Int. Cl.
*H02S 40/36*    (2014.01)
*H02H 7/20*    (2006.01)
*H02S 40/32*    (2014.01)
*H02H 3/05*    (2006.01)
*H02S 40/30*    (2014.01)

(52) U.S. Cl.
CPC .............. *H02S 40/36* (2014.12); *H02H 7/20* (2013.01); *H02S 40/32* (2014.12); *H02H 3/05* (2013.01); *H02S 40/30* (2014.12)

(58) Field of Classification Search
CPC .......... H02S 40/36; H02S 40/32; H02S 50/00; H02S 40/30; H02H 7/20; H02H 3/05
See application file for complete search history.

(56) References Cited

U.S. PATENT DOCUMENTS

2016/0049537 A1*    2/2016    Ueda ................... H01L 31/0504
136/244
2016/0190798 A1*    6/2016    Narla ..................... H02H 7/122
307/80

(Continued)

FOREIGN PATENT DOCUMENTS

JP    2012-511299 A    5/2012
WO    2010/065043 A1    6/2010

*Primary Examiner* — Michael Y Sun
(74) *Attorney, Agent, or Firm* — SHINJYU GLOBAL IP

(57) ABSTRACT

A solar power generation system includes a string, an inverter, and a plurality of shut-off devices. The string includes a plurality of solar cell module groups. The plurality of shut-off devices is configured to cut off a connection between the plurality of solar cell module groups in response to a control signal from the inverter. The plurality of solar cell module groups includes a first group, a second group connected to the first group, and a third group connected to the second group. The plurality of shut-off devices includes a first shut-off device. The first shut-off device includes a first switching unit connected to an anode-side terminal of the second group. The first switching unit includes a first open-close unit and a first semiconductor switching device connected in parallel with the first open-close unit. The first semiconductor switching device is turned ON before the first open-close unit is operated.

13 Claims, 11 Drawing Sheets

(56) References Cited

U.S. PATENT DOCUMENTS

| | | | |
|---|---|---|---|
| 2017/0271875 A1* | 9/2017 | Narla | H02S 40/32 |
| 2019/0027617 A1* | 1/2019 | Varlan | H02S 50/10 |
| 2021/0281065 A1* | 9/2021 | Zhu | H02S 40/32 |

* cited by examiner

| OPERATION MODE | | WEATHER SUNLIGHT | POWER GENERATION | CONTROL SIGNAL | RELAY OPERATION MODE |
|---|---|---|---|---|---|
| START | | ☀ | YES | ON | ON |
| ACTIVE | | ☀ | YES | ON | ON |
| SAFETY | NORMAL CUTOFF | 🌙☁ | NO | OFF | OFF |
| | | ⛅ | UNSTABLE | ON | ON/OFF |
| EMERGENCY SAFETY CUTOFF | | ☀ | YES | OFF | OFF |

FIG. 8

SOLAR POWER GENERATION SYSTEM

CROSS-REFERENCE TO RELATED APPLICATION

This application claims priority to Japanese Patent Application No. 2022-076267, filed May 2, 2022. The contents of that application are incorporated by reference herein in their entirety.

FIELD

The present invention relates to a solar power generation system.

BACKGROUND

In the United States, for the purpose of protecting firefighters from electric shock in an emergency such as a fire, the introduction into a solar power generation system of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shut-off device having the rapid shutdown function is installed for each solar cell module. However, the shut-off device for each solar cell module increases the installation cost of the shut-off devices.

Further, the shut-off device of a solar power generation system uses a switching device that is configured to open and close a mechanical contact such as a relay as a switching device for cutting off an electric path in the solar power generation system. The switching device is driven by the power supplied from the solar cell modules of the solar power generation system. If the amount of power generated by the solar cell modules is smaller than that required for driving the switching device, for example, even if an attempt is made to close the contact of the switching device with the power from the solar cell modules (even if an attempt is made to turn the switching device into an ON state), the contact is opened immediately (the switching device is turned into an OFF state), and the closing and opening may be repeated. Further, when the amount of power generated by the solar cell modules becomes unstable, the switching device may be repeatedly switched between the ON state and the OFF state. The occurrence of this phenomenon makes the operation of the solar power generation system unstable.

An object of the claimed invention is to provide a solar power generation system that achieves both the decrease in installation cost of shut-off devices and the improvement of stability of the solar power generation system.

A solar power generation system according to one aspect of the present invention includes a string, an inverter, and a plurality of shut-off devices. The string includes a plurality of solar cell module groups connected in series with each other. The plurality of solar cell module groups each include one or a plurality of solar cell modules connected in series with each other. The inverter is connected to the string and is configured to convert DC power output from the solar cell modules to AC power. The inverter includes a control unit configured to output a control signal. The plurality of shut-off devices is configured to cut off electrical connections between the plurality of solar cell module groups in response to the control signal from the inverter. The plurality of solar cell module groups each have an open circuit voltage equal to or less than a predetermined open circuit voltage. The plurality of solar cell module groups includes a first group, a second group connected to the first group, and a third group connected to the second group. The plurality of shut-off devices includes a first shut-off device. The first shut-off device includes a first switching unit connected to an anode-side terminal of the second group. The first switching unit includes a first open-close unit and a first semiconductor switching device connected in parallel with the first open-close unit. The control unit is configured to output the control signal such that the first semiconductor switching device is turned ON before the first open-close unit is operated.

In this solar power generation system, since each of the plurality of solar cell module groups has an open-circuit voltage equal to or less than a predetermined open-circuit voltage, a highly safe solar power generation system can be provided. In addition, the first switching unit of the first shut-off device includes the first open-close unit and the first semiconductor switching device which is turned ON before the first open-close unit is operated. In the first shut-off device, the first semiconductor switching device is turned ON before the first open-close unit is operated, and thereby it is possible to reduce the occurrence of a phenomenon in which, when the amount of power generated by the second group is less than the power required for driving the first open-close unit and/or when the amount of power generated by the second group is unstable, the first open-close unit opens and closes according to the amount of power generated by the second group, and the connection and cutoff of the electric path to which an anode side terminal of the second group is connected is repeated. As a result, the operation of the solar power generation system is stabilized.

The first switching unit may include a second open-close unit connected in series with the first semiconductor switching device. In this case, the first semiconductor switching device can be reliably electrically cut off from the solar power generation system.

The first shut-off device may include a second switching unit connected to a cathode side terminal of the second group. The second switching unit may include a third open-close unit and a second semiconductor switching device connected in parallel with the third open-close unit. The control unit may be configured to output the control signal such that the second semiconductor switching device is turned ON before the third open-close unit is operated. In this case, a plurality of electric paths can be opened and closed by the first shut-off device alone. In addition, in the second switching unit, it is possible to reduce the occurrence of a phenomenon in which, when the amount of power generated by the second group is less than that required for driving the third open-close unit and/or when the amount of power generated by the second group is unstable, the third open-close unit opens and closes according to the amount of power generated by the second group, and connection and cutoff of the electric path in connection with the cathode side terminal of the second group is repeated.

The second switching unit may include a fourth open-close unit connected in series with the second semiconductor switching device. In this case, the second semiconductor switching device can be reliably electrically cut off from the solar power generation system.

The first shut-off device may be configured in a manner that allows opening and closing of the first switching unit and the second switching unit to be controlled independently of each other. In this case, for example, when a problem occurs in the first switching unit, the second switching unit in normal operation can be used to cut off the electric path.

The first shut-off device may further include a first bypass device connected in parallel with the second group. In this case, even if the amount of power generated by the second group decreases, the power generated by another solar cell module group can be transferred to the inverter via the first bypass device.

The plurality of solar cell module groups may further include a fourth group connected to the third group, and a fifth group connected to the fourth group. The plurality of shut-off devices may further include a second shut-off device configured to be driven by power generated by one or a plurality of solar cell modules of the fourth group connected in series. The second shut-off device may include a third switching unit connected to an anode side terminal of the fourth group. The third switching unit may include a fifth open-close unit and a third semiconductor switching device connected in parallel with the fifth open-close unit. The control unit may be configured to output the control signal such that the third semiconductor switching device is turned ON before the fifth open-close unit is operated. In this case, it is possible to reduce the occurrence of a phenomenon in which, when the amount of power generated by the fourth group is less than the power required for driving the fifth open-close unit and/or when the amount of power generated by the fourth group is unstable, the fifth open-close unit opens and closes according to the amount of power generated by the fourth group, and the connection and cutoff of the electric path in connection with the anode side terminal of the fourth group is repeated.

The third switching unit may include a sixth open-close unit connected in series with the third semiconductor switching device. In this case, the third semiconductor switching device can be reliably electrically cut off from the solar power generation system.

The second shut-off device may include a fourth switching unit connected to a cathode side terminal of the fourth group. The fourth switching unit may include a seventh open-close unit and a fourth semiconductor switching device connected in parallel with the seventh open-close unit. The control unit may be configured to output the control signal such that the fourth semiconductor switching device is turned ON before the seventh open-close unit is operated. In this case, a plurality of electric paths can be opened and closed by the second shut-off device alone. In addition, in the fourth switching unit, it is possible to reduce the occurrence of a phenomenon in which, when the amount of power generated by the fourth group is less than that required for driving the seventh open-close unit and/or when the amount of power generated by the fourth group is unstable, the seventh open-close unit opens and closes according to the amount of power generated by the fourth group, and the connection and cutoff of the electric path in connection with cathode side terminal of the fourth group is repeated.

The fourth switching unit may include an eighth open-close unit connected in series with the fourth semiconductor switching device. In this case, the fourth semiconductor switching device can be reliably electrically cut off from the solar power generation system.

The second shut-off device may be configured in a manner that allows opening and closing of the third switching unit and the fourth switching unit to be controlled independently of each other. In this case, for example, when a problem occurs in the third switching unit, the fourth switching unit in normal operation can be used to cut off the electric path.

The second shut-off device may further include a second bypass device connected in parallel with the fourth group. In this case, even if the amount of power generated by the fourth group decreases, the power generated by another solar cell module group can be transferred to the inverter via the second bypass device.

The plurality of solar cell module groups in the string may each have an open circuit voltage of 165 V or less. In this case, a safer solar power generation system can be provided.

The inverter may be configured to output the control signal to the plurality of shut-off devices by power line communication. In this case, when the plurality of shut-off devices is disposed in an existing solar power generation system, additional wiring for ensuring the communication between the inverter and the plurality of shut-off devices can be omitted, which reduces the installation cost of the plurality of shut-off devices.

The inverter may be configured to output the control signal to the plurality of shut-off devices by wireless communication. In this case, the control signal can be output to the plurality of shut-off devices by remote control.

BRIEF DESCRIPTION OF THE DRAWINGS

FIG. 8 is a diagram illustrating an example of an operation mode of a shut-off device.

DETAILED DESCRIPTION

Figure 1:
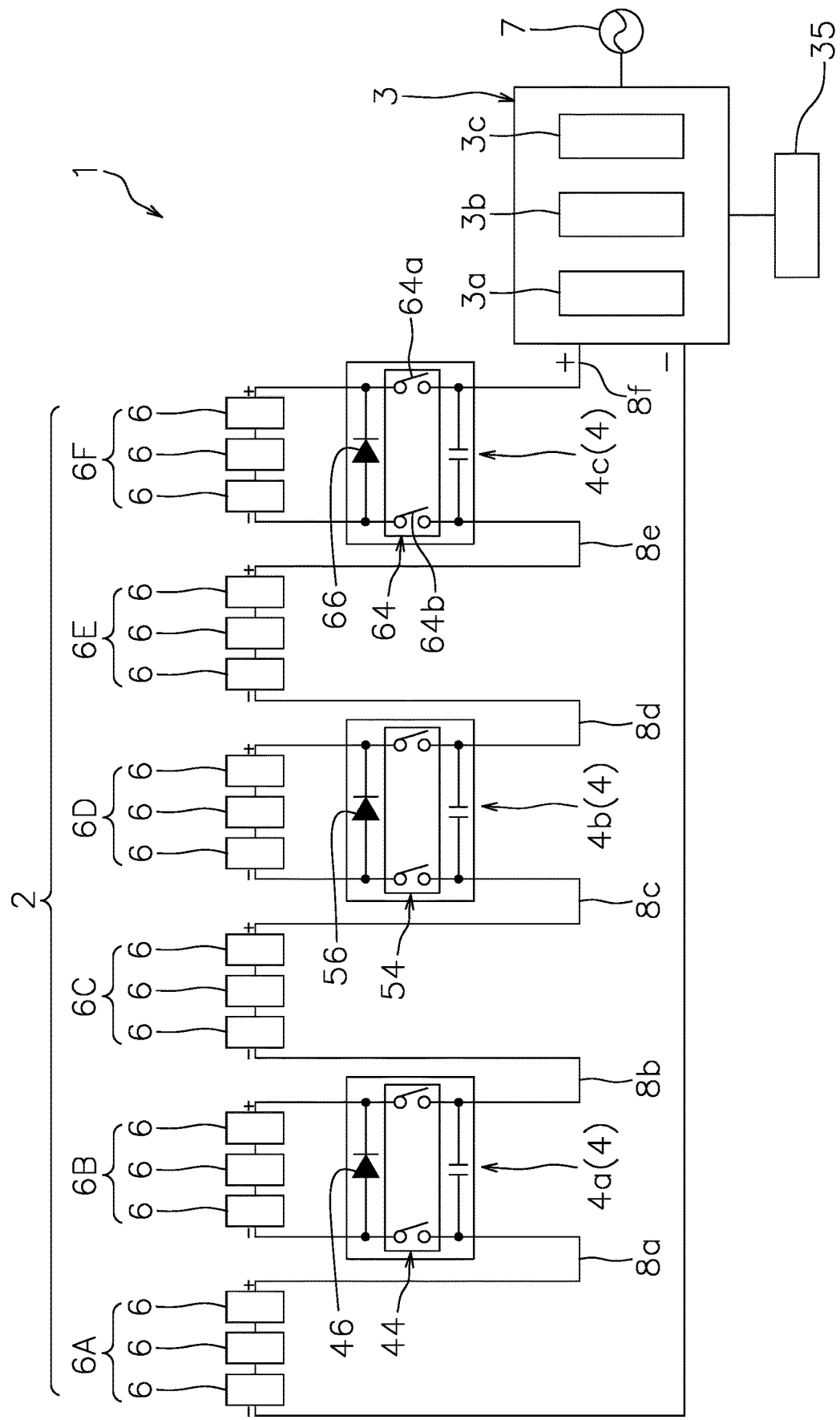
FIG. 1 is a block diagram schematically showing a configuration of a solar power generation system according to an aspect of the claimed invention.

FIG. 1 is a block diagram schematically showing a configuration of a solar power generation system 1 according to an aspect of the claimed invention. The solar power generation system 1 includes a string 2, an inverter 3, and a plurality of shut-off devices 4.

The string 2 includes a plurality of solar cell module groups connected in series with each other. Each of the plurality of solar cell module groups includes one or a plurality of solar cell modules 6 connected in series. That is, the string 2 includes a plurality (18 in the illustrated embodiment) of solar cell modules 6 connected in series with each other. The plurality of solar cell module groups in the present embodiment include six solar cell module groups 6A to 6F. Note that the solar power generation system 1 may include a solar cell array in which a plurality of strings 2 are connected in parallel.

Each of the plurality of solar cell module groups 6A to 6F has an open circuit voltage equal to or less than a predetermined open circuit voltage. The predetermined open circuit voltage is, for example, 165 V. That is, in the string 2, the plurality of solar cell module groups is divided into groups so that each group has an open circuit voltage of 165 V or less. The solar cell modules 6 may have an open circuit voltage of 50 V, for example. Hereinafter, the solar cell module groups 6A to 6F may be referred to as groups 6A to 6F. The groups 6A to 6E in this embodiment are examples of first to fifth groups.

Each of the groups 6A to 6F may include three solar cell modules 6 connected in series with each other. Thus, each of the open circuit voltages of the groups 6A to 6F may be 150 V.

The groups 6A to 6F are arranged in alphabetical order from the group 6A to the group 6F and are connected in series with each other. The groups 6A to 6F each include an anode-side terminal (+) and a cathode-side terminal (−). The anode-side terminal in each of the groups 6A to 6F corresponds to the anode-side terminal of the solar cell modules 6 closest to the anode of the inverter 3 among the plurality of solar cell modules 6 in the groups 6A to 6F. The cathode in each of the groups 6A to 6F corresponds to the cathode-side terminal of the solar cell modules 6 farthest from the anode of the inverter 3 among the plurality of solar cell modules 6 in the groups 6A to 6F.

The anode-side terminal of the group 6A corresponds to the anode-side terminal of the solar cell module 6 closest to the group 6B among the plurality of solar cell modules 6 in the group 6A and is connected to the cathode-side terminal of the group 6B. The cathode-side terminal of the group 6A corresponds to the cathode-side terminal of the solar cell module 6 farthest from the group 6B among the plurality of the solar cell modules 6 in the group 6A and is connected to the cathode-side terminal of the inverter 3.

The anode-side terminal of the group 6B corresponds to the anode-side terminal of the solar cell module 6 closest to the group 6C among the plurality of solar cell modules 6 in the group 6B and is connected to the cathode-side terminal of the group 6C. The cathode-side terminal of the group 6B corresponds to the cathode-side terminal of the solar cell module 6 closest to the group 6A among the plurality of the solar cell modules 6 in the group 6B and is connected to the anode-side terminal of the group 6A.

The anode-side terminal of the group 6C is connected to the cathode-side terminal of the group 6D. The cathode-side terminal of the group 6C is connected to the anode-side terminal of the group 6B. The anode-side terminal of the group 6D is connected to the cathode-side terminal of the group 6E. The cathode-side terminal of the group 6D is connected to the anode-side terminal of the group 6C. The anode-side terminal of the group 6E is connected to the cathode-side terminal of the group 6F. The cathode-side terminal of the group 6E is connected to the anode-side terminal of the group 6D. The anode-side terminal of the group 6F is connected to the anode-side terminal of the inverter 3. The cathode-side terminal of the group 6F is connected to the anode-side terminal of the group 6E.

The solar cell modules 6 receive sunlight to generate power, and output the generated electrical power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system or load devices.

Specifically, the inverter 3 includes a DC/DC converter 3a, a DC/AC inverter 3b, and a control unit 3c. The DC/DC converter 3a converts the voltage of the electrical power output from the solar cell modules 6 into a predetermined voltage and inputs it to the DC/AC inverter 3b. The DC/AC inverter 3b converts the DC power output from the solar cell modules 6, which has been converted to a predetermined DC voltage via the DC/DC converter 3a, into AC power. The control unit 3c includes a CPU and memory and controls the DC/DC converter 3a and the DC/AC inverter 3b. The control unit 3c outputs a control signal to the plurality of shut-off devices 4 by power line communication.

The plurality of shut-off devices 4 is connected to electric paths connecting between the groups 6A to 6F. The plurality of shut-off devices 4 cuts off the connections between the groups 6A to 6F in response to the control signal output from the inverter 3. In the disclosed embodiment, the plurality of shut-off devices 4 includes three shut-off devices 4a to 4c. The shut-off device 4a in this embodiment is an example of a first shut-off device, and the shut-off device 4b in this embodiment is an example of a second shut-off device.

The shut-off device 4a is connected to an electric path 8a connecting the group 6A and the group 6B and an electric path 8b connecting the group 6B and the group 6C. The shut-off device 4a cuts off the connection between the group 6A and the group 6B and the connection between the group 6B and the group 6C in response to the control signal from the inverter 3. Specifically, the shut-off device 4a cuts off the electrical paths 8a and 8b by cutting off the voltage output from the solar cell module 6 of the group 6B in response to the control signal from the inverter 3. As a result, the connection between the group 6A and the group 6B and the connection between the group 6B and the group 6C are cut off.

The shut-off device 4a is driven by the electrical power generated by the solar cell modules 6 of the group 6B. The shut-off device 4a is externally attached to the solar cell modules 6 of the group 6B, for example.

Figure 2:
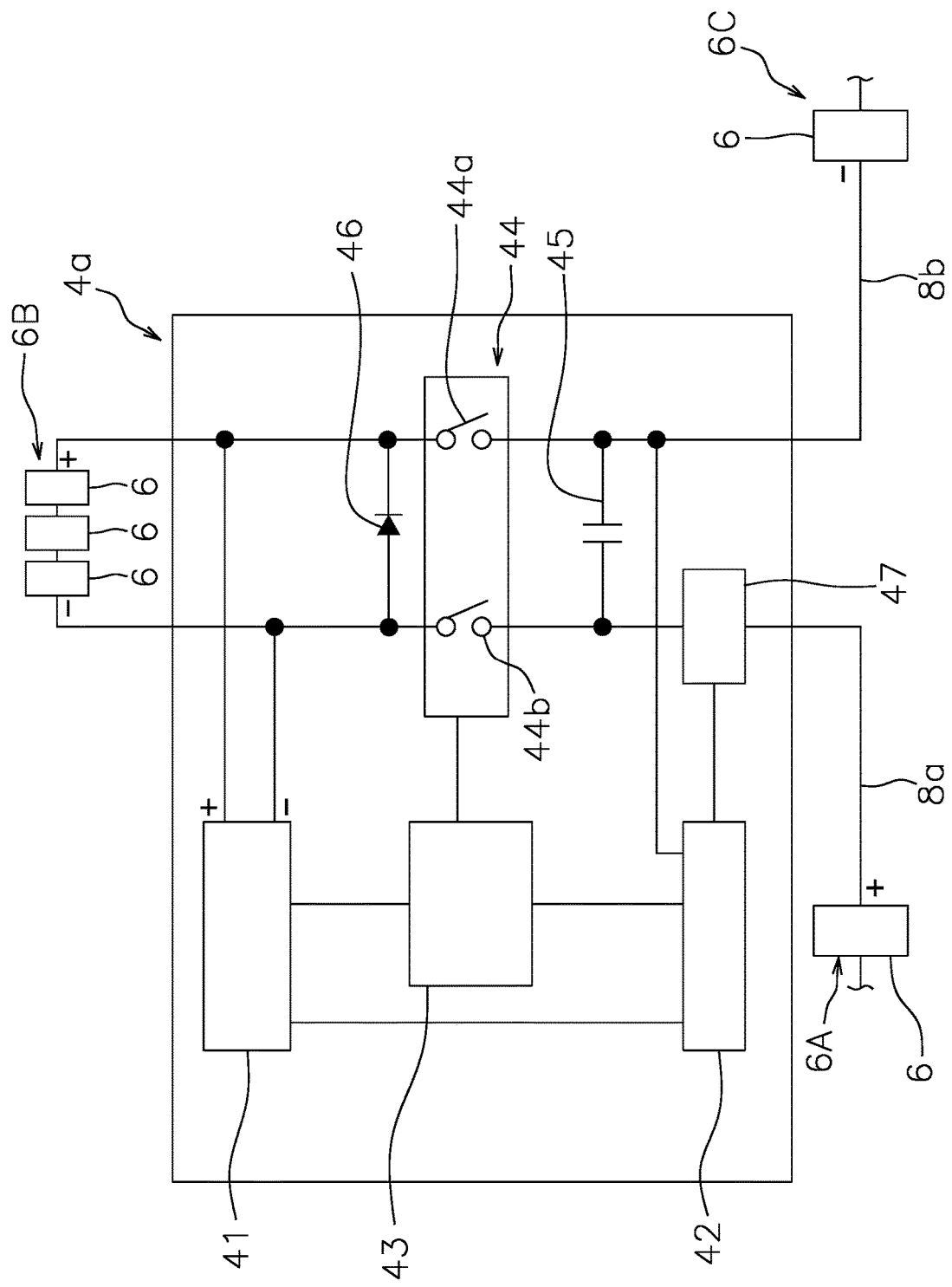
FIG. 2 is a block diagram schematically showing a configuration of a shut-off device.

FIG. 2 is a block diagram schematically showing a configuration of the shut-off device 4a. The shut-off device 4a includes a regulator 41, a signal receiving unit 42, a control unit 43, a relay 44, a bypass circuit 45, a bypass device 46, and a signal detection unit 47.

The regulator 41 is connected in parallel to the group 6B. The regulator 41 uses the electrical power generated by the solar cell module 6 as a power source to generate a drive power for driving the shut-off device 4a and supplies the drive power source in a stable state to the shut-off device 4a. Here, only the power generated by the solar cell modules 6 of the group 6B is used to generate the drive power to drive the shut-off device 4a.

Figure 3:
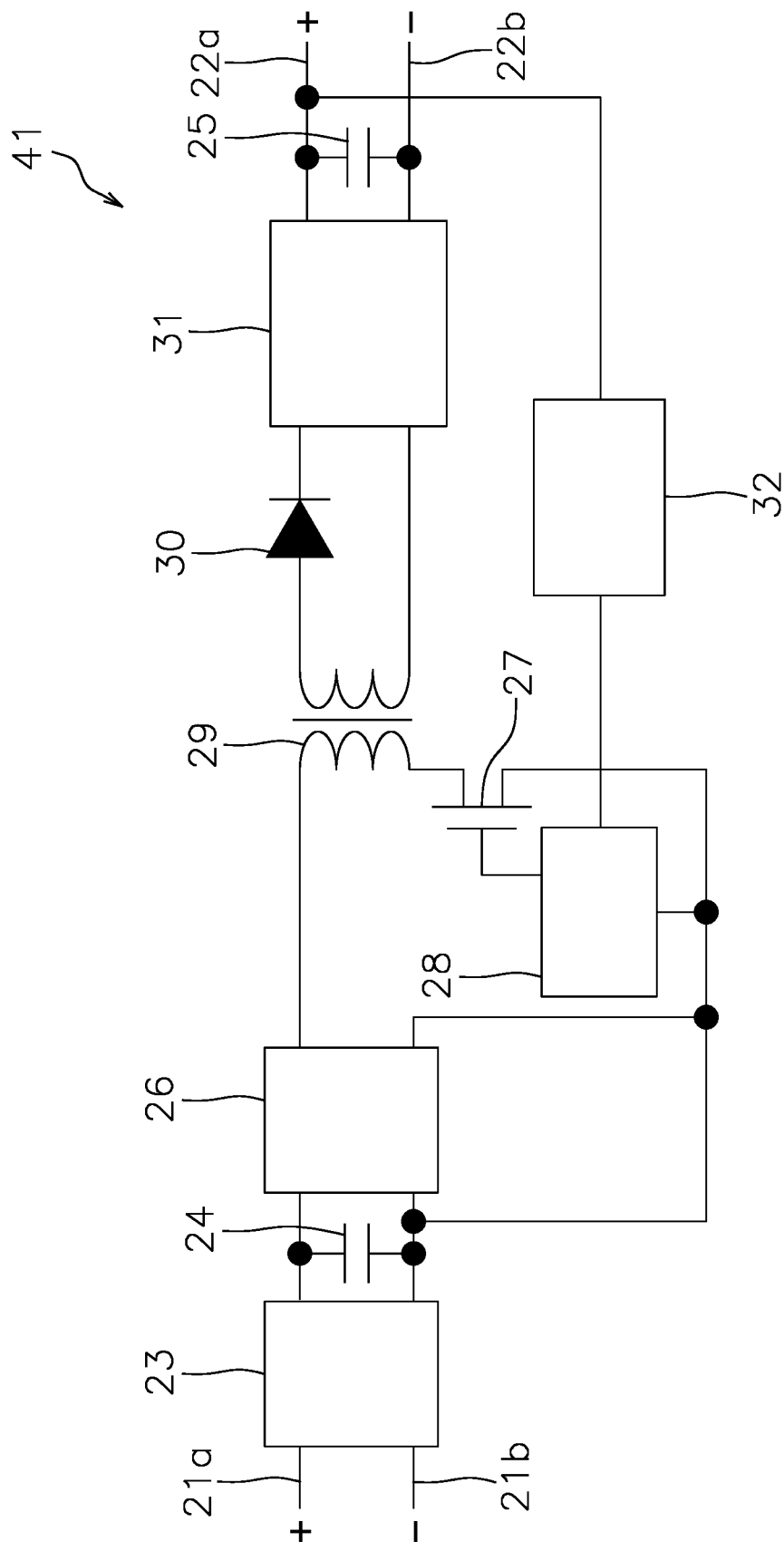
FIG. 3 is a circuit diagram schematically showing a configuration of a regulator.

FIG. 3 is a circuit diagram schematically showing a configuration of the regulator 41. The regulator 41 has a well-known configuration and includes input terminals 21a and 21b, output terminals 22a and 22b, a line filter 23, capacitors 24 and 25, a booster circuit 26, a switching element 27, a control circuit 28, a transformer 29, a diode 30, a DC/DC converter 31, a feedback circuit 32 and the like.

The signal receiving unit 42 receives the control signal from the control unit 3c of the inverter 3 and outputs the received control signal to the control unit 43. Specifically, the signal receiving unit 42 receives the control signal from the control unit 3*c* of the inverter 3 via the signal detection unit 47 that detects the control signal from the control unit 3*c* of the inverter 3.

The control unit 43 includes a CPU and memory. The control unit 43 controls the opening and closing of the relay 44 based on the signals output from the signal receiving unit 42.

The relay 44 includes a first switching unit 44*a* and a second switching unit 44*b*. The first switching unit 44*a* is disposed in the electric path 8*b*. The first switching unit 44*a* connects or cuts off the group 6B and the group 6C. The first switching unit 44*a* is connected to the anode side terminal of the group 6B and the cathode side terminal of the group 6C.

The second switching unit 44*b* is disposed in the electric path 8*a*. The second switching unit 44*b* connects or cuts off the group 6A and the group 6B. The second switching unit 44*b* is connected to the anode side terminal of the group 6A and the cathode side terminal of the group 6B. In the present embodiment, the second switching unit 44*b* may be omitted.

When the drive power is not supplied from the regulator 41 to the shut-off device 4*a*, the first switching unit 44*a* and the second switching unit 44*b* are in an OFF state all the time. Accordingly, when the shut-off device 4*a* is not driven, the connection between the group 6A and the group 6B and the connection between the group 6B and the group 6C are in a cutoff state.

The bypass circuit 45 is a circuit for allowing the signal receiving unit 42 to receive the control signal from the control unit 3*c* in a state where the connection between the group 6A and the group 6B and the connection between the group 6B and the group 6C are cut off. In a state where the connection between the group 6A and the group 6B and the connection between the group 6B and the group 6C are cut off, the signal receiving unit 42 can receive the control signal from the control unit 3*c* via the bypass circuit 45.

The bypass device 46 is connected in parallel to the group 6B. Specifically, the bypass device 46 has one end connected between the cathode-side terminal of the group 6B and the second switching unit 44*b*. The bypass device 46 has the other end connected between the anode-side terminal of the group 6B and the first switching unit 44*a*. The bypass device 46 may, for example, be a diode having an anode connected between the cathode-side terminal of the group 6B and the second switching unit 44*b* and a cathode connected between the anode-side terminal of the group 6B and the first switching unit 44*a*.

When the group 6B is unable to output sufficient power due to an abnormality such as a sudden power drop or abnormal heat generation in the group 6B, the bypass device 46 forms an electric path that "bypasses" the group 6B and transfers the power generated by the other solar cell module groups. When the group 6B cannot output sufficient power, the bypass device 46 is able to immediately form an electric path that bypasses the group 6B in which an abnormality has occurred, based on its own electrical characteristics without any command of an external signal.

It should be noted that the two terminals of the bypass device 46 could be connected to any point as desired as long as the group 6B to which the shut-off device 4*a* is connected is bypassed and also at least one of the terminals of the bypass device 46 is connected to the group 6B without connection to the first switching unit 44*a* or the second switching unit 44*b*. For example, a configuration is possible in which the anode of the bypass device 46 is connected to the electric path connecting the anode side terminal of the group 6A and second switching unit 44*b* and the cathode of the bypass device 46 is connected to the electric path connecting the anode side terminal of the group 6B and the first switching unit 44*a*.

The shut-off device 4*b* has the same configuration as the shut-off device 4*a* except that the connected electrical path is different from the shut-off device 4*a*. The shut-off device 4*b* is connected to an electric path 8*c* connecting the group 6C and the group 6D and an electric path 8*d* connecting the group 6D and the group 6E. The shut-off device 4*b* cuts off the connection between the group 6C and the group 6D and the connection between the group 6D and the group 6E in response to the control signal from the inverter 3.

The shut-off device 4*b* is driven by the electrical power generated by the solar cell modules 6 of the group 6D. The shut-off device 4*a* is externally attached to the solar cell modules 6 of the group 6D, for example.

Figure 4:
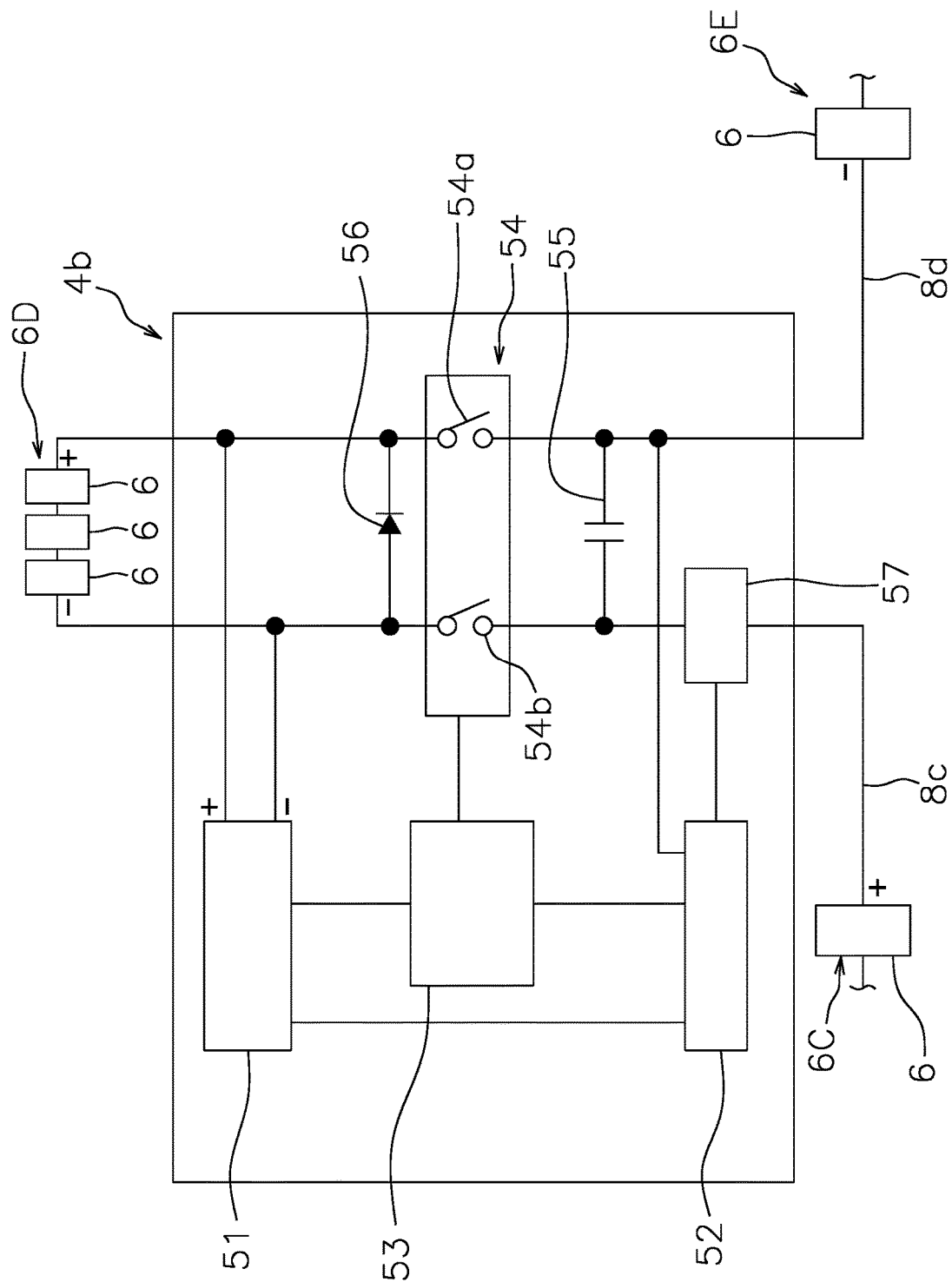
FIG. 4 is a block diagram schematically showing a configuration of a shut-off device.

As shown in FIG. 4, the shut-off device 4*b* includes a regulator 51, a signal receiving unit 52, a control unit 53, a relay 54, a bypass circuit 55, a bypass device 56, and a signal detection unit 57. The relay 54 includes a first switching unit 54*a* and a second switching unit 54*b*. Since each configuration of the shut-off device 4*b* is the same as each configuration of the shut-off device 4*a*, each configuration of the shut-off device 4*b* will be briefly described.

The regulator 51 uses the electrical power generated by the solar cell module 6 as a power source to generate a drive power for driving the shut-off device 4*b*. Here, only the power generated by the solar cell modules 6 of the group 6D is used to generate the drive power to drive the shut-off device 4*b*.

The signal receiving unit 52 receives the control signal from the control unit 3*c* of the inverter 3 and outputs the received control signal to the control unit 53.

The control unit 53 controls the opening and closing of the relay 54. The first switching unit 54*a* is connected to the anode-side terminal of the group 6D. The first switching unit 54*a* is disposed in the electric path 8*d*. The first switching unit 54*a* opens and closes the connection between the group 6D and the group 6E. The second switching unit 54*b* is connected to the cathode-side terminal of the group 6D. The second switching unit 54*b* is disposed in the electric path 8*c*. The second switching unit 54*b* opens and closes the connection between the group 6C and the group 6D.

The bypass device 56 is connected in parallel to the group 6D. The bypass device 56 may, for example, be a diode having an anode connected between the cathode-side terminal of the group 6D and the second switching unit 54*b* and a cathode connected between the anode-side terminal of the group 6D and the first switching unit 54*a*.

The shut-off device 4*c* has the same configuration as the shut-off device 4*a* except that the connected electrical path is different from the shut-off device 4*a* and the shut-off device 4*b*. That is, the shut-off device 4*c* includes a regulator, a signal receiving unit, a control unit, a relay 64 including a first switching unit 64*a* and second switching unit 64*b*, a bypass circuit, a bypass device 66, and a signal detection unit. Since each configuration of the shut-off device 4*c* is the same as each configuration of the shut-off device 4*a*, a description of each configuration of the shut-off device 4*c* is omitted.

The shut-off device 4*c* is connected to an electric path 8*e* connecting the group 6E and the group 6F and an electric path 8*f* connecting the group 6F and the inverter 3. The shut-off device 4*c* cuts off the connection between the group 6E and the group 6F and the connection between the group 6F and the inverter 3 in response to the control signal from the inverter 3.

Figure 5:
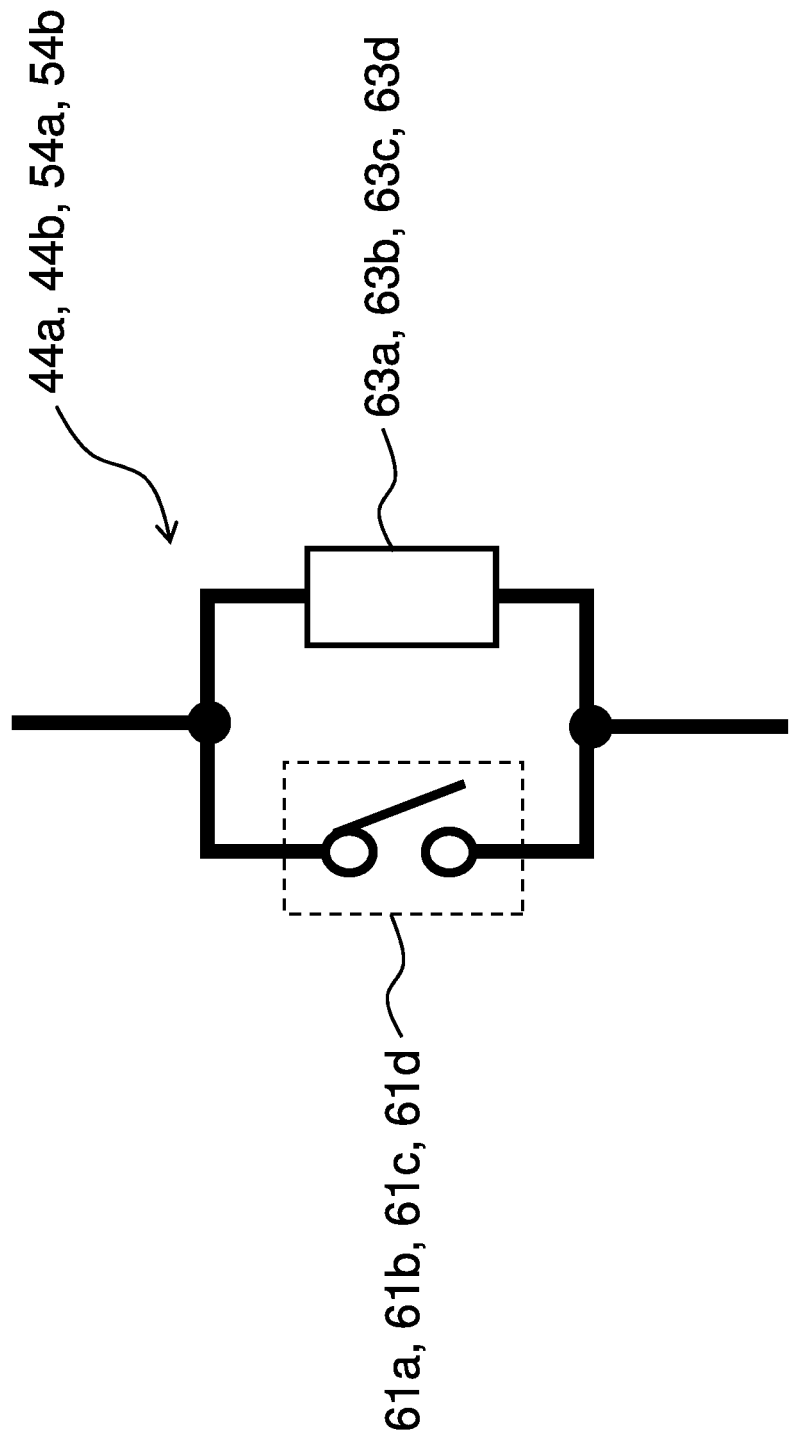
FIG. 5 is a diagram illustrating a configuration of first and second switching units.

Next, with reference to FIG. 5, the configuration of the first switching unit 44a and the second switching unit 44b is described in detail. The first switching unit 44a includes an open-close unit 61a and a semiconductor switching device 63a. Similarly, the second switching unit 44b includes an open-close unit 61b and a semiconductor switching device 63b.

The open-close units 61a and 61b may, for example, each be a switching device that is configured to open and close a contact to connect and cut off an electric path connected to the open-close units 61a and 61b. The open-close units 61a and 61b may, for example, be mechanical relays.

The open-close unit 61a has one end connected to the anode side terminal of the group 6B and the other end connected to the cathode side terminal of the group 6C, so as to be driven to open and close by the control unit 43.

The open-close unit 61b has one end connected to the anode side terminal of the group 6A and the other end connected to the cathode side terminal of the group 6B, so as to be driven to open and close by the control unit 43.

The semiconductor switching device 63a is connected in parallel with the open-close unit 61a, and turns a different electric path from the open-close unit 61a conductive or non-conducting. The semiconductor switching device 63b is connected in parallel with the open-close unit 61b, and turns a different electric path from the open-close unit 61b conductive or non-conducting. Each of the semiconductor switching devices 63a and 63b may, for example, be a MOSFET device or an Insulated Gate Bipolar Transistor (IGBT) device.

The semiconductor switching device 63a has a gate electrode and the semiconductor switching device 63b has a gate electrode, and these gate electrodes are connected to the control unit 43. The control unit 43 is configured to output a predetermined voltage signal to these gate terminals to put the semiconductor switching devices 63a and 63b into an ON state or an OFF state. Here, the "ON state" means that the semiconductor switching devices 63a and 63b become conductive, and the "OFF state" means that the semiconductor switching devices 63a and 63b become non-conducting.

When a voltage signal is output to the gate terminals to turn ON or OFF the semiconductor switching devices 63a and 63b such as MOSFET devices or IGBT devices, almost no current flows through the gate terminals. Using such MOSFET devices, IGBT devices, or the like as the semiconductor switching devices 63a and 63b leads to reduction of the power required to turn the semiconductor switching devices 63a and 63b ON or OFF.

When the amount of power generated by the group 6B is small and/or unstable, the open-close unit 61a of the first switching unit 44a and the open-close unit 61b of the second switching unit 44b repeatedly open and close, in which case the operation of the solar power generation system 1 becomes unstable. Therefore, when the amount of power generated by the group 6B is small and/or unstable, the semiconductor switching devices 63a and 63b are turned ON before the open-close units 61a and 61b are operated to open and close. That is, before opening or closing of the open-close units 61a and 61b, an electric path other than the open-close units 61a and 61b are brought into a conductive state. Specifically, when the open-close units 61a and 61b are switched from the open state to the closed state in order to turn the first switching unit 44a and the second switching unit 44b ON, the semiconductor switching devices 63a and 63b are turned ON while keeping the open-close units 61a and 61b open, and then, the open-close units 61a and 61b are switched from the open state to the closed state.

After the open-close units 61a and 61b have entered the closed state, the semiconductor switching devices 63a and 63b may remain in the ON state or be switched to the OFF state. This is because, with the open-close units 61a and 61b in the closed state, the first switching unit 44a and the second switching unit 44b can be turned ON regardless of the state of the semiconductor switching devices 63a and 63b. Whether to keep the semiconductor switching devices 63a and 63b in the ON state or switch them to the OFF state can be appropriately determined depending on the usage or the like.

When the open-close units 61a and 61b are switched from the closed state to the open state in order to turn the first switching unit 44a and the second switching unit 44b OFF, the semiconductor switching devices 63a and 63b are turned ON while the open-close units 61a and 61b remain closed, and then the open-close units 61a and 61b are switched from the closed state to the open state. After the open-close units 61a and 61b have entered the opened state, the semiconductor switching devices 63a and 63b are switched from the ON state to the OFF state. It should be noted that this operation is preferably performed before the amount of power generated by the group 6B decreases and/or becomes unstable.

With the above operations, when the amount of power generated by the group 6B is small and/or when the amount of power generated by the group 6B is unstable, it is possible to reduce the occurrence of the phenomenon in which the open-close units 61a and 61b are opened and closed repeatedly. This is because the open-close units 61a and 61b does not operate when the amount of power generated by the group 6B is small and/or unstable. As a result, the solar power generation system 1 can operate stably even when the amount of power generated by the group 6B is small and/or unstable.

Even when the amount of power generated by the group 6B is stable and sufficiently large, when opening and closing the open-close units 61a and 61b are operated, the semiconductor switching devices 63a and 63b are turned ON before the open-close units 61a and 61b are operated.

The semiconductor switching devices 63a and 63b, such as MOSFET devices or IGBT devices, generate few noise components when switching between an ON state and OFF state due to their characteristics. Also, the open-close units 61a and 61b such as relays do not generate a large noise unless a large voltage is applied to both ends thereof during switching operations. Accordingly, turning on the semiconductor switching devices 63a and 63b before the open-close units 61a and 61b are opened or closed precludes a large voltage from being applied to both ends of the open-close units 61a and 61b, and thereby the open-close units 61a and 61b are unlikely to generate a noise during switching operations. As a result, noise to be generated is reduced in the first switching unit 44a and the second switching unit 44b, and the operation of the solar power generation system 1 is stabilized. Also, since a large noise is not generated in the open-close units 61a and 61b, the open-close units 61a and 61b do not need to have a large voltage tolerance, resulting in cost reduction of the open-close units 61a and 61b.

The first switching unit 54a of the shut-off device 4b includes an open-close unit 61c and a semiconductor switching device 63c. The open-close unit 61c has one end connected to the anode side terminal of the group 6D and the other end connected to the cathode side terminal of the group 6E. The semiconductor switching device 63c is connected in parallel with the open-close unit 61c.

The second switching unit 54b of the shut-off device 4b includes an open-close unit 61d and a semiconductor switching device 63d. The open-close unit 61d has one end connected to the anode side terminal of the group 6C and the other end connected to the cathode side terminal of the group 6D. The semiconductor switching device 63d is connected in parallel with the open-close unit 61d.

Each of the first switching unit 64a and the second switching unit 64b of the shut-off device 4c includes an open-close unit (not shown) and a semiconductor switching device (not shown).

The first switching unit 54a of the shut-off device 4b and the first switching unit 64a of the shut-off device 4c have the same configuration as the first switching unit 44a of the shut-off device 4a, so the description is omitted. The second switching unit 54b of the shut-off device 4b and the second switching unit 64b of the shut-off device 4c have the same configuration as the second switching unit 44b of the shut-off device 4a, so the description is omitted.

Figure 6:
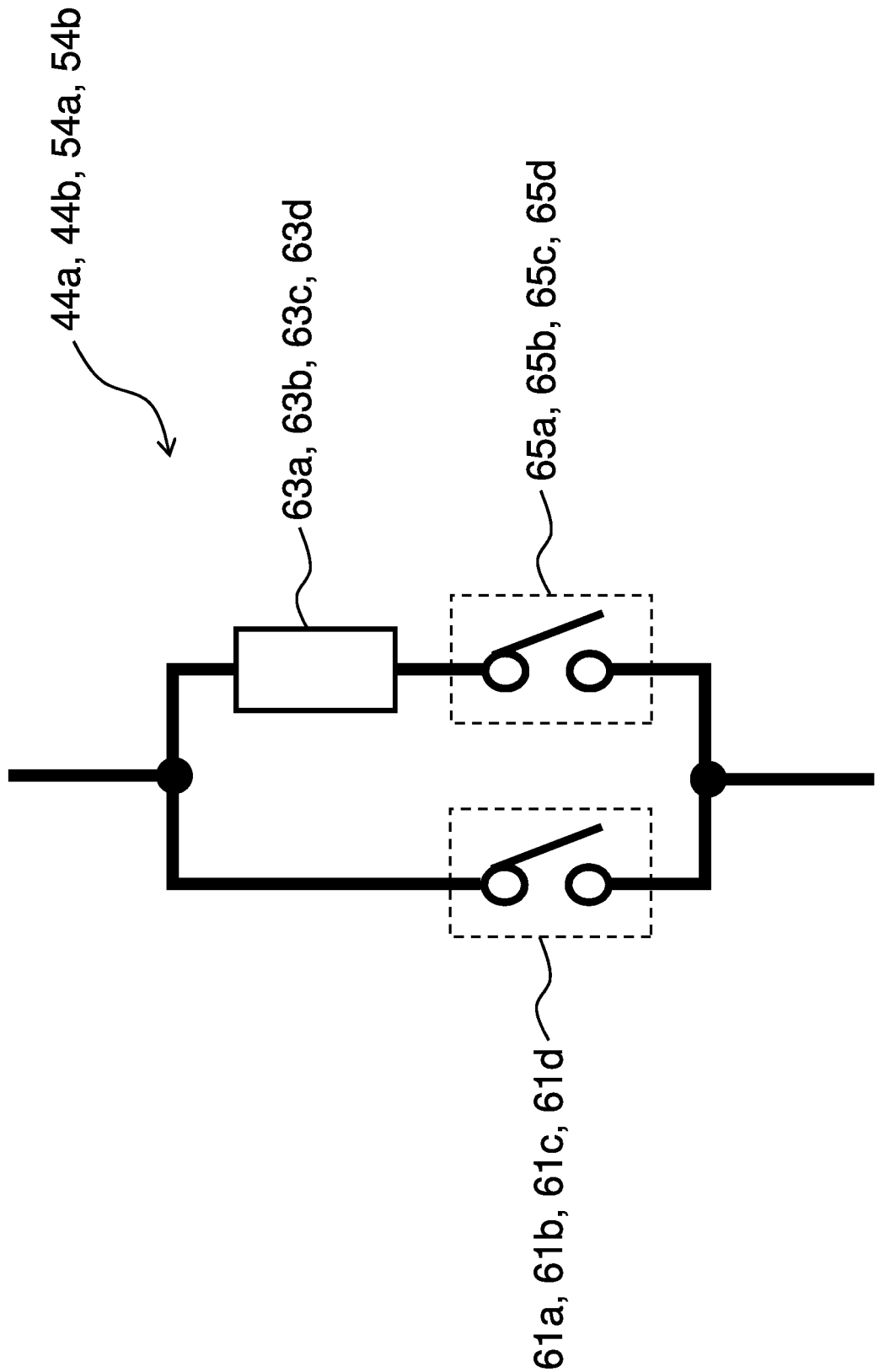
FIG. 6 is a diagram showing another configuration of first and second switching units.

As another example of the configuration of the first switching units 44a and 54a and the second switching units 44b and 54b, additional open-close units 65a to 65d may be connected in series with the semiconductor switching devices 63a to 63d, respectively, as shown in FIG. 6. The semiconductor switching devices 63a to 63d are merely electrically insulated by alternately arranging P-type semiconductor regions and N-type semiconductor regions in a semiconductor material. That is, the semiconductor switching devices 63a to 63d are not able to be completely non-conducting. In contrast, the open-close units 61a to 61d completely cut off the electric path when the two contacts are separated from each other for cutoff. Thus, by connecting the open-close units 65a to 65d to the semiconductor switching devices 63a to 63d in series, the semiconductor switching devices 63a to 63d can be electrically cut off from the solar power generation system 1 reliably. In the first switching unit 64a and the second switching unit 64b of the shut-off device, another open-close unit may be connected in series with the semiconductor switching device.

Figure 7:
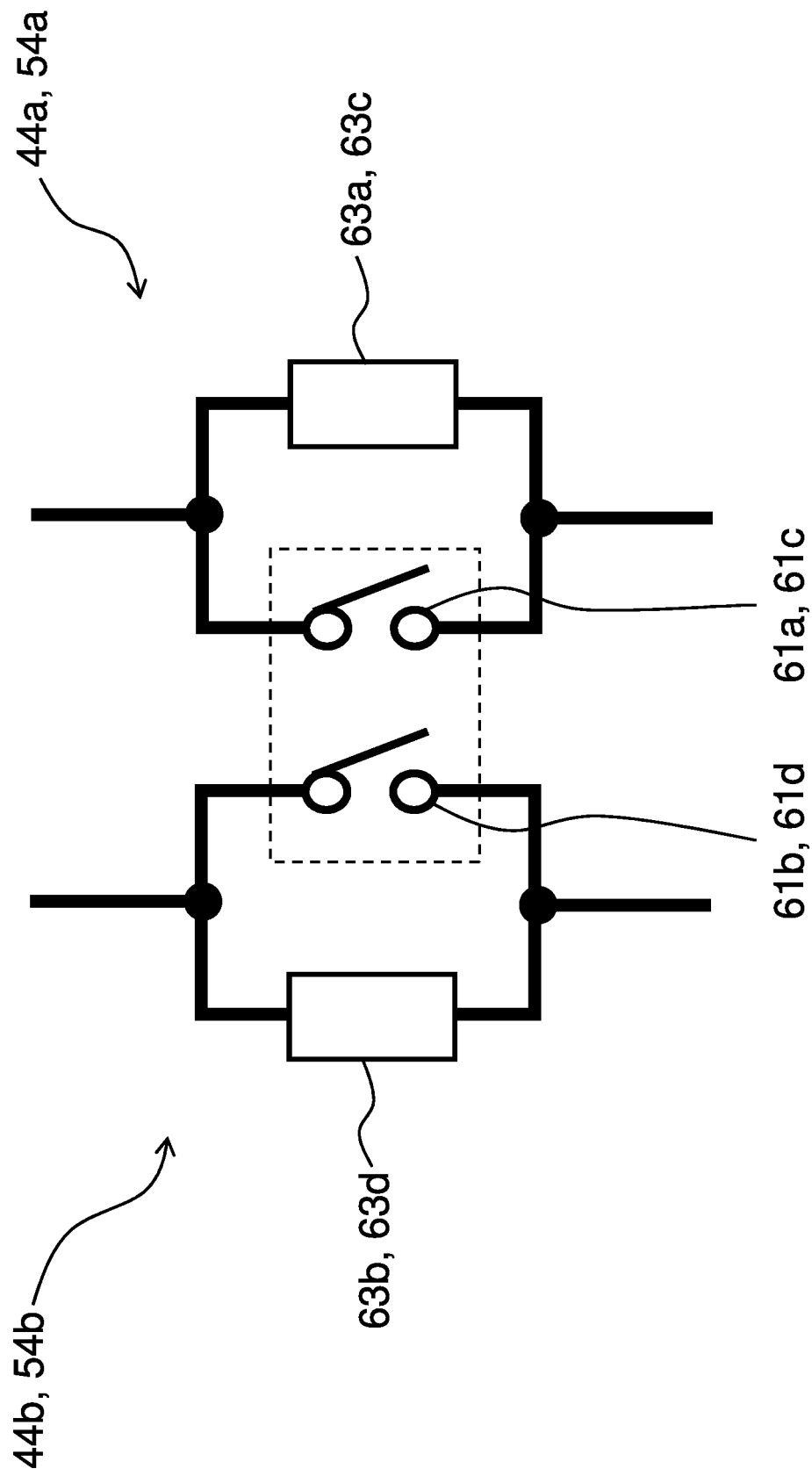
FIG. 7 is a diagram showing another configuration of first and second switching units.

As another example of the configuration of the first switching units 44a and 54a and the second switching units 44b and 54b, as shown in FIG. 7, a two-pole switching element may be used for the open-close units 61a and 61b. In this case, before opening or closing the open-close units 61a and 61b, the semiconductor switching devices 63a and 63b, which are connected in parallel with the open-close unit 61a and 61b to be opened and closed, are turned ON. Similarly, a two-pole switching element may be used for the open-close units 61c and 61d, and a two-pole switching element may be used for the open-close units of the shut-off device 4c.

Next, with reference to FIG. 8, the operation modes of the plurality of shut-off devices 4 will be described mainly using the operation of the shut-off device 4a as an example. The three operation modes of the plurality of shut-off devices 4 include a start mode, an active mode, and a safety mode. The safety mode includes a normal shut-off mode and an emergency safety shut-off mode. Thus, the plurality of shut-off devices 4 operates in four operation modes: a start mode, an active mode, a normal shut-off mode, and an emergency safety shut-off mode.

The start mode is a mode that turns effective when sunlight starts to hit the solar cell modules 6. At this time, the solar cell modules 6 receive sunlight to generate power. Then, the shut-off device 4a is driven by the drive power generated by the regulator 41 using the power generated by the solar cell modules 6 of the group 6B. When the control unit 43 receives the control signal from the control unit 3c of the inverter 3 via the signal receiving unit 42, the control unit 43 turns the semiconductor switching device 63a and unit 43 the semiconductor switching device 63b ON, and then closes the open-close unit 61a and the open-close unit 61b. As a result, the first switching unit 44a and the second switching unit 44b are turned ON.

In the start mode, the amount of power generated by the group 6B is small. Thus, in the start mode, the open-close units 61a and 61b repeatedly open and close, destabilizing the operation of the solar power generation system 1. For this reason, in the start mode, the semiconductor switching devices 63a and 63b are turned ON when the amount of power generated by the group 6B is small. At this time, the open-close units 61a and 61b are in the open state. Next, when the amount of power generated by the group 6B becomes larger than the power required for driving the open-close units 61a and 61b, the open-close units 61a and 61b are closed. With the configuration, it is possible to reduce the occurrence of the phenomenon that the open-close units 61a and 61b repeatedly open and close. In addition, since the first switching unit 44a and the second switching unit 44b can be turned ON by an electric path (that is, the semiconductor switching devices 63a and 63b) other than the open-close units 61a and 61b, an electric path connecting the string 2 and the inverter 3 is secured in the start mode.

The active mode is a state in which the solar cell modules 6 receive sunlight during the daytime to generate power and is substantially the same as the start mode. Thus, in the active mode, the groups 6A to 6F are in connection with each other via the shut-off devices 4a to 4c, and the power generated by the solar cell modules 6 is output to the inverter 3.

In the active mode, when the amount of power generated by the group 6B decreases (for example, when the solar cell module is shaded), the semiconductor switching devices 63a and 63b are turned ON, and the open-close units 61a and 61b are opened. After that, when the amount of power generated by the group 6B becomes larger than the power required for driving the open-close units 61a and 61b, the open-close units 61a and 61b are switched from the open state to the closed state. Thus, in the active mode, it is possible to reduce the occurrence of the phenomenon that the open-close units 61a and 61b repeatedly open and close when the amount of power generated by the group 6B becomes small. In addition, since the first switching unit 44a and the second switching unit 44b can be turned ON by the semiconductor switching devices 63a and 63b, even if the amount of power generated by the group 6B decreases in the active mode, the power generated in the string 2 can be supplied to the inverter 3.

The normal shut-off mode is a mode when the solar cell modules 6 are not exposed to sunlight at night or due to the influence of bad weather such as rain. Accordingly, in the normal shut-off mode, the solar cell modules 6 do not generate power, and no power is supplied from the solar cell modules 6 to the shut-off devices 4a to 4c. For this reason, in the normal shut-off mode, the first switching units 44a, 54a, 64a and the second switching units 44b, 54b, 64b are all in the open state. In the normal shut-off mode, when there is no power generation from the solar cell modules 6, no control signal is output from the control unit 3c of the inverter 3. However, an AC power source supplies power to the inverter 3, and thereby the control unit 3*c* of the inverter 3 may output a control signal at any time except during the emergency safety shut-off mode.

When the power generation by the group 6B is unstable in the normal shut-off mode due to the unstable weather or the like, as in the start mode, the semiconductor switching devices 63*a* and 63*b* are turned ON when the amount of power generated by the group 6B is small, and the open-close units 61*a* and 61*b* are closed when the amount of power generated by the group 6B becomes larger than the power required for driving the open-close units 61*a* and 61*b*, The emergency safety shut-off mode is a mode in which the electric paths 8*a* to 8*f* are cut off so that the power supply from the solar cell modules 6 to the inverter 3 is stopped during the start mode or the active mode. In the present embodiment, as shown in FIG. 1, an operation switch 35 is connected to the inverter 3 and the operation switch 35 is operated during the start mode or the active mode of the shut-off devices 4*a* to 4*c*, the operation mode of the shut-off devices 4*a* to 4*c* is switched to the emergency safety shut-off mode.

Specifically, when the operation switch 35 is operated, the control unit 3*c* stops the output of the control signal. When the signal detection unit 47 detects the stop of the control signal of a fixed cycle, the first switching unit 44*a* and the second switching unit 44*b* of the relay 44 are turned into the OFF state via the signal receiving unit 42 and the control unit 43. As a result, the connection between the group 6A and the group 6B and the connection between the group 6B and the group 6C are cut off.

Similarly, when the shut-off device 4*b* detects the stop of the control signal of a fixed cycle, the shut-off device 4*b* controls the first switching unit 54*a* and the second switching unit 54*b* of the relay 54 to the open state. As a result, the connection between the group 6C and the group 6D and the connection between the group 6D and the group 6E are cut off. Similarly, when the shut-off device 4*c* detects the stop of the control signal of a fixed cycle, the shut-off device 4*c* controls the first switching unit 64*a* and the second switching unit 64*b* of the relay 64 to the open state. As a result, the connection between the group 6E and the group 6F and the connection between the group 6F and the inverter 3 are cut off. As a result, all the groups 6A to 6F are separated from each other, so that the open circuit voltage of the string 2 is divided into 165V or less.

The operation of the shut-off devices 4*b* and 4*c* in each mode is the same as that of the shut-off device 4*a*, so the detailed explanation is omitted.

In the solar power generation system 1 of the above configuration, the plurality of solar cell module groups 6A to 6F each have an open circuit voltage of 165 V or less, so a highly safe solar power generation system can be provided. The first switching unit 44*a* of the shut-off device 4*a* includes the open-close unit 61*a* and the semiconductor switching device 63*a* which is turned into the ON state before opening or closing of the open-close unit 61*a*. In the shut-off device 4*a*, the semiconductor switching device 63*a* is turned ON before the open-close unit 61*a* is operated, and thereby it is possible to reduce the occurrence of a phenomenon in which, when the amount of power generated by the group 6B is less than the power required for driving the open-close unit 61*a* and/or when the amount of power generated by the group 6B is unstable, the open-close unit 61*a* opens and closes according to the amount of power generated by the group 6B, and the connection and cutoff of the electric path to which an anode side terminal of the group 6B is connected is repeated. As a result, the operation of the solar power generation system 1 is stabilized.

Since a large voltage is not applied across the open-close unit 61*a*, the open-close unit 61*a* is less likely to generate noise and chattering during the opening and closing operations. In addition, the semiconductor switching device 63*a* has a characteristic that it hardly generates noise and chattering during the switching operation between the ON state and the OFF state. As a result, noise and chattering are reduced in the first switching unit 44*a*, and the operation of the solar power generation system 1 is stabilized.

The same effect as that of the first switching unit 44*a* of the shut-off device 4*a* can be obtained by the second switching unit 44*b* of the shut-off device 4*a*, the first switching unit 54*a* and the second switching unit 54*b* of the shut-off device 4*b*, and the first switching unit 64*a* and the second switching unit 64*b* of the shut-off device 4*c*.

One embodiment of the present invention has been described above, but the present invention is not limited to the above embodiment, and various modifications are possible as long as the modifications are within the scope of the disclosure.

The number of groups of the plurality of solar cell module groups or the number of solar cell modules included in each group is not limited to the above embodiment. The string 2 may be divided into a plurality of solar cell module groups as long as each group has an open circuit voltage of 165 V or less. Similarly, in the above embodiment, the plurality of shut-off devices 4 include three shut-off devices 4*a* to 4*c*, but the number in the plurality of shut-off devices 4 is not limited to the above embodiment.

Figure 9:
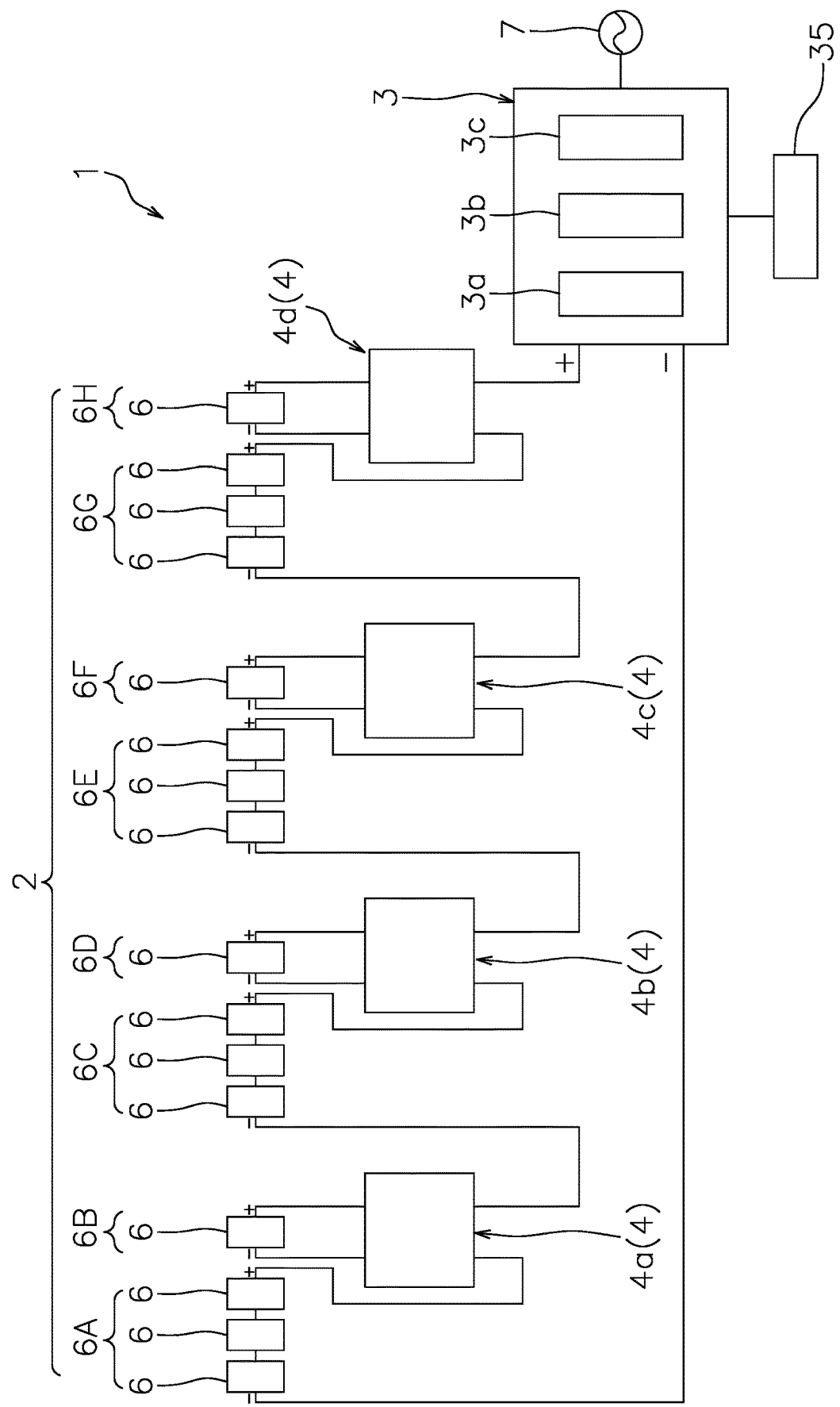
FIG. 9 is a block diagram schematically showing a configuration of a solar power generation system according to another embodiment of the claimed invention.

As shown briefly in FIG. 9, the plurality of shut-off devices 4 may be disposed so that the open voltage of the string 2 is divided into 165 V or less at the time of cutoff. In FIG. 9, the plurality of shut-off devices 4 include four shut-off devices 4*a* to 4*d*. Each of the groups 6A, 6C, 6E, and 6G includes three solar modules 6 connected in series with each other, and each of the groups 6B, 6D, 6F, and 6H includes one solar module 6. Thus, each of the open circuit voltage of the groups 6A, 6C, 6E, and 6G is 150 V, and each of the open circuit voltage of the groups 6B, 6D, 6F, and 6H is 50 V. Alternatively, at least one of the plurality of solar cell module groups may include two solar modules 6.

Figure 10:
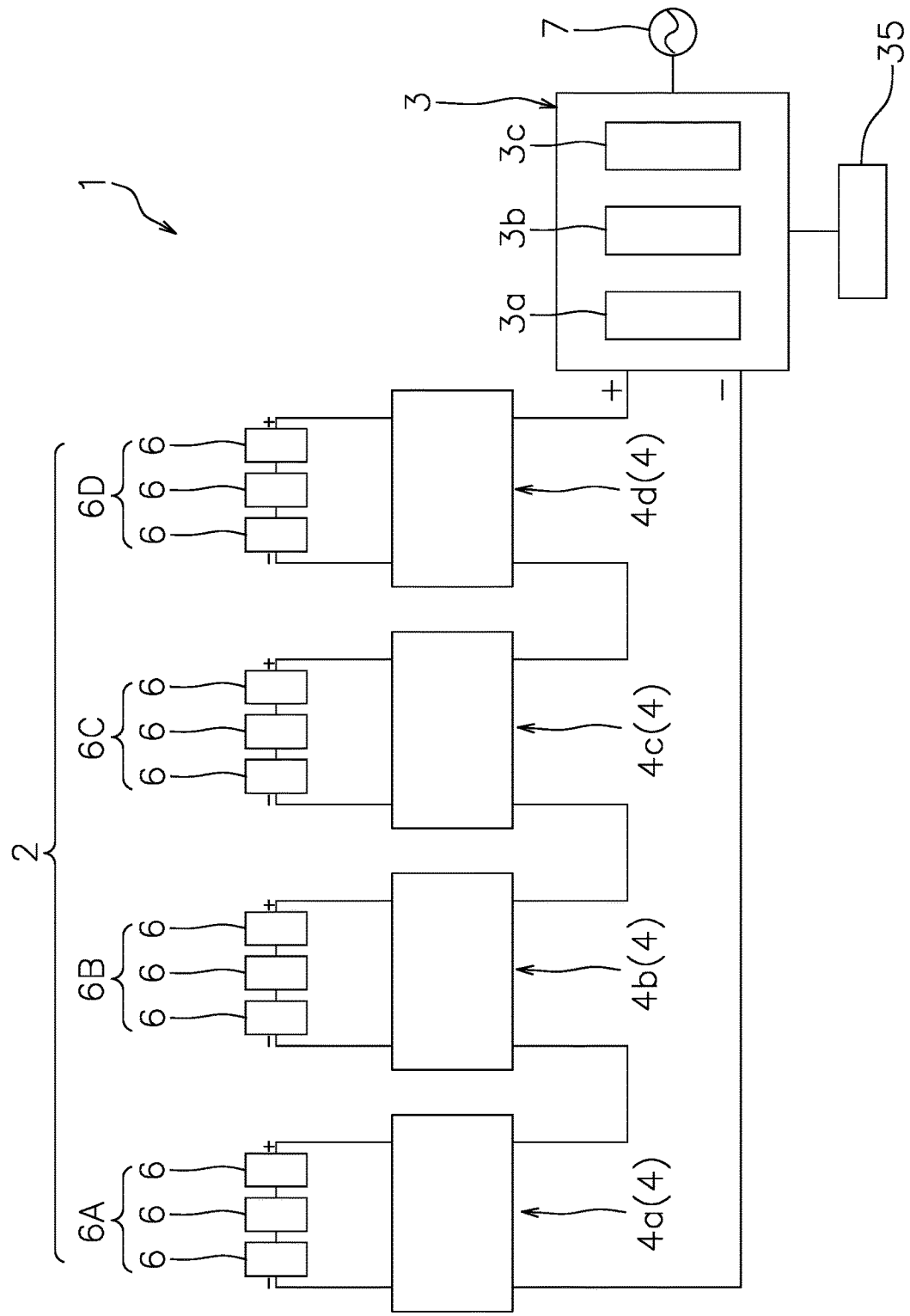
FIG. 10 is a block diagram schematically showing a configuration of a solar power generation system according to another embodiment of the claimed invention.

As shown briefly in FIG. 10, the plurality of shut-off devices 4 may be disposed in each of the plurality of solar module groups. In this case, each of the plurality of solar module groups preferably includes a plurality of solar cell modules 6.

Figure 11:
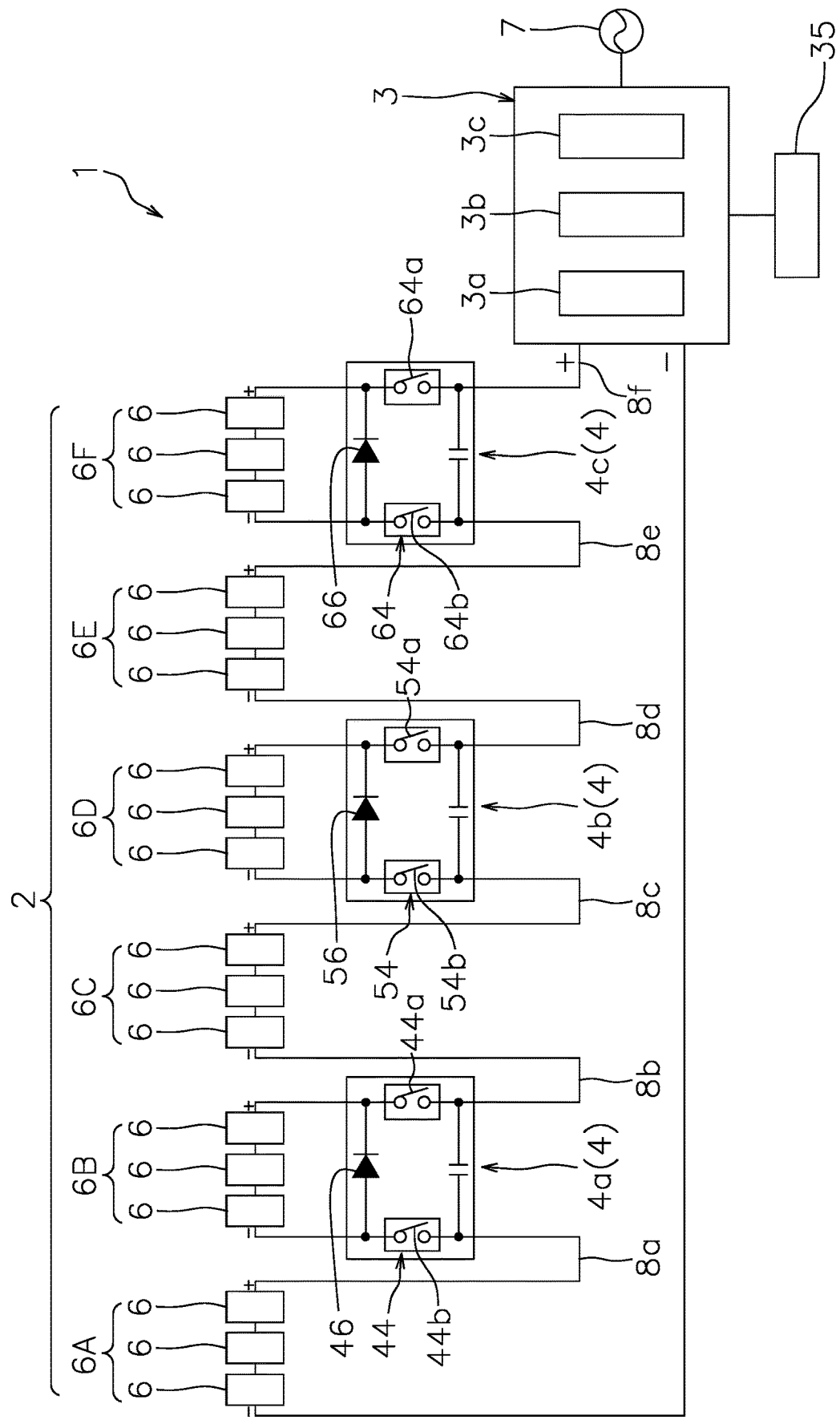
FIG. 11 is a block diagram schematically showing a configuration of a solar power generation system according to another embodiment of the claimed invention.

In the above embodiment, the relay 44 of the shut-off device 4*a* has two contacts of the first switching unit 44*a* and the second switching unit 44*b*, but as shown briefly in FIG. 11, the relay 44 may be two relays having a single contact. That is, the shut-off device 4*a* may be configured to independently control the opening and closing of the first switching unit 44*a* and the second switching unit 44*b*. Similarly, the shut-off device 4*b* may be configured to independently control the opening and closing of the first switching unit 54*a* and the second switching unit 54*b*. Similarly, the shut-off device 4*c* may be configured to independently control the opening and closing of the first switching unit 64*a* and the second switching unit 64*b*.

In the above embodiment, the control signal is output to the plurality of shut-off devices 4 by power line communication, but the control signal may be output to the plurality of shut-off devices 4 by wireless communication such as Wi-Fi®. Alternatively, the inverter 3 and the plurality or shut-off devices 4 may be configured to be in communication with each other by wireless communication.

The control signal from the inverter 3 may be stopped in modes other than the emergency safety shut-off mode or part of the normal shut-off mode (when "NO" in "POWER GENERATION" in FIG. 8), and the control signal from the inverter 3 may be output in the emergency safety shut-off mode or part of the normal shut-off mode. In this case, the plurality of shut-off devices 4 may open the first open-close unit and the second open-close unit upon receiving the control signal from the inverter 3, and may close the first open-close unit and the second open-close unit while not receiving the control signal.

REFERENCE NUMERALS

1 Solar power generation system
2 String
3 Inverter
4 Plurality of shut-off devices
4a Shut-off device (example of first shut-off device)
6 Solar cell module
44a First switching unit
44b Second switching unit
46 Bypass device (example of first bypass device)
47 Signal detection unit
61a Open-close unit (example of first open-close unit)
61b Open-close unit (example of third open-close unit)
63a Semiconductor switching device (example of first semiconductor switching device)
65a Another open-close unit (example of second open-close unit)
65b Another open-close unit (example of fourth open-close unit)

The invention claimed is:

1. A solar power generation system, comprising:
a string including a plurality of solar cell module groups connected in series with each other, the plurality of solar cell module groups each including one or a plurality of solar cell modules connected in series with each other;
an inverter connected to the string, the inverter being configured to convert DC power output from the string to AC power and including a control unit configured to output a control signal; and
a plurality of shut-off devices configured to cut off electrical connections between the plurality of solar cell module groups in response to the control signal from the inverter,
wherein the plurality of solar cell module groups each have an open circuit voltage equal to or less than a predetermined open circuit voltage,
the plurality of solar cell module groups includes a first group, a second group connected to the first group, and a third group connected to the second group,
the plurality of shut-off devices includes a first shut-off device configured to be driven by power generated by one or a plurality of solar cell modules of the first group connected in series,
the first shut-off device includes a first switching unit connected to one of an anode-side terminal and a cathode-side terminal of the second group,
the first switching unit includes a first open-close unit and a first semiconductor switching device connected in parallel with the first open-close unit, the control unit is configured to output the control signal such that the first semiconductor switching device is turned ON before the first open-close unit is operated,
the plurality of solar cell module groups further includes a fourth group connected to the third group, and a fifth group connected to the fourth group,
the plurality of shut-off devices further includes a second shut-off device configured to be driven by power generated by one or a plurality of solar cell modules of the fourth group connected in series,
the second shut-off device includes a third switching unit connected to one of an anode-side terminal and a cathode-side terminal of the fourth group,
the third switching unit includes a fifth open-close unit and a third semiconductor switching device connected in parallel with the fifth open-close unit,
the control unit is configured to output the control signal such that the third semiconductor switching device is turned ON before the fifth open-close unit is operated,
the second shut-off device includes a fourth switching unit connected to the other of said anode-side terminal and said cathode-side terminal of the fourth group,
the fourth switching unit includes a seventh open-close unit and a fourth semiconductor switching device connected in parallel with the seventh open-close unit, and
the control unit is configured to output the control signal such that the fourth semiconductor switching device is turned ON before the seventh open-close unit is operated.

2. The solar power generation system according to claim 1, wherein the first switching unit includes a second open-close unit connected in series with the first semiconductor switching device.

3. The solar power generation system according to claim 1,
wherein the first shut-off device includes a second switching unit connected to the other of said anode-side terminal and said cathode-side terminal of the second group,
the second switching unit includes a third open-close unit and a second semiconductor switching device connected in parallel with the third open-close unit, and
the control unit is configured to output the control signal such that the second semiconductor switching device is turned ON before the third open-close unit is operated.

4. The solar power generation system according to claim 3, wherein the second switching unit includes a fourth open-close unit connected in series with the second semiconductor switching device.

5. The solar power generation system according to claim 3, wherein the first shut-off device is configured in a manner that allows opening and closing of the first switching unit and the second switching unit to be controlled independently of each other.

6. The solar power generation system according to claim 1, wherein the first shut-off device further includes a first bypass device connected in parallel with the second group.

7. The solar power generation system according to claim 1, wherein the third switching unit includes a sixth open-close unit connected in series with the third semiconductor switching device.

8. The solar power generation system according to claim 1, wherein the fourth switching unit includes an eighth open-close unit connected in series with the fourth semiconductor switching device.

9. The solar power generation system according to claim 1, wherein the second shut-off device is configured in a manner that allows opening and closing of the third switching unit and the fourth switching unit to be controlled independently of each other.

10. The solar power generation system according to claim 1, wherein the second shut-off device further includes a second bypass device connected in parallel with the fourth group.

11. The solar power generation system according to claim 1, wherein the open circuit voltage of each of the plurality of solar cell module groups in the string is 165 V or less.

12. The solar power generation system according to claim 1, wherein the inverter is configured to output the control signal to the plurality of shut-off devices by power line communication.

13. The solar power generation system according to claim 1, wherein the inverter is configured to output the control signal to the plurality of shut-off devices by wireless communication.

* * * * *